Patented July 7, 1931

1,813,366

UNITED STATES PATENT OFFICE

HEINRICH TEUSCH, OF ESSEN, GERMANY

METHOD OF REMOVING THE BITTER TASTE FROM ORANGE PEELS

No Drawing. Application filed October 3, 1927, Serial No. 223,843, and in Germany October 11, 1926.

My invention relates to improvements in the method of removing the bitter taste from orange peels, and the object of the improvements is to treat the orange peels so that the whole mass thereof can be used in the manufacture of liquors, fruit juices, jams, confectionery, and the like.

I have discovered that the bitter taste of orange peels can be removed by treating the same with suitable liquids, such as water or water containing other matter. In carrying out the process I pour the water on the peels, and I allow the water and the peels to stand several days, whereupon the peels are freed of the bitter taste without losing their flavor. Further, I have discovered that the water taking up the bitter matter if allowed to stand for a time loses the bitter taste, so that a valuable pleasant tasting flavoring liquid is obtained which can likewise be used by itself for the treatment of peels in the manufacture of eatables or the like.

In a modification of the process I allow the peels contained within the water to ferment more or less, whereby the bitter taste is more readily removed. The beginning of the fermentation may be started, for example, by pouring a liquid on the peels, which or a part of which has before been used for treating peels, or I raise the liquid to the temperature suitable for fermentation. Further, in lieu of cold water hot water or steam can be used for removing the bitter taste, in which case the matter will not ferment.

To prevent loss of valuable substances by the process of freeing the orange peels of the bitter taste, I prefer to use fruit juices, such for example as orange juice, for removing the bitter taste of the peels. Preferably liquids are used which before have been produced for treating orange peels. I have discovered that the bitter taste is more readily removed by means of liquids of this kind than by means of pure water, and that it may be carried out within a few hours. In this case the bitter taste is not only removed from the peels, but further a part of the matter contained in the liquid passes into the peels. Thus there is a certain exchange of matter between the peels and the liquid used for treating the same.

In the course of the process the specific gravity rises by the liquid taking up extracted matter, and it may be set down again by adding water. I may use fresh extract liquid or preserved liquid. Further, the liquid may be allowed to stand and to undergo a certain fermentation before being used. In any state it is suitable for being used in the process, and I have found that it increases in value while the process is being carried out, because it gradually gains in flavor. Thus, according to my improved process products having a taste and flavor can be produced which heretofore could not be manufactured. By reason of the said flavor the extract is particularly suitable for manufacturing refreshing beverages. For example it may be used in mixture with orange juice. Fermentation of the peels is not necessary. It is sufficient to treat the same by means of the extract liquid about four hours or for a period of time sufficient to extract the bitter principle from the peels.

Preferably the outer yellow portion of the peels is treated separate from the white portion of the peel, which white portion may be treated while being on the fruit itself.

I claim:

1. The herein described process of treating orange peels preparatory to using the same in the manufacture of food, confectionery, jam, extracts for refreshing beverages and the like, which consists in removing the bitter taste from orange peels by treating the same with water, and causing fermentation of the peels contained within the water.

2. The herein described process of treating orange peels preparatory to using the same in the manufacture of food and drink, which consists in removing the bitter taste from orange peels by treating them with water of which at least a part has already been used for treating said peels, and causing fermentation of the peels within the water.

3. The herein described process of treating orange peels preparatory to using the same in the manufacture of food, confectionery, jam, extracts for refreshing beverages and the like, which consists in subjecting orange peels to the action of water to obtain an extract liquid having flavoring value of which a part includes the bitter taste of orange peel, allowing the extract liquid to stand until it substantially loses its bitter taste, then subjecting orange peels other than those first treated, to the non-bitter extract liquid whereby the bitter taste is extracted from the last mentioned orange peels while the flavoring values are retained in said last mentioned peels.

In testimony whereof I hereunto affix my signature.

HEINRICH TEUSCH.